Dec. 12, 1933.                J. C. KARNES ET AL                    1,938,595
                                TRAINING APPARATUS
                                Filed June 12, 1930
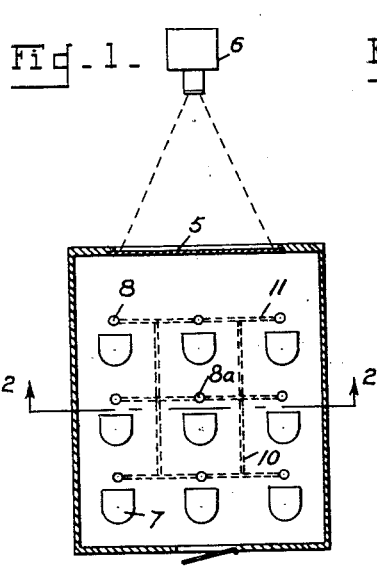
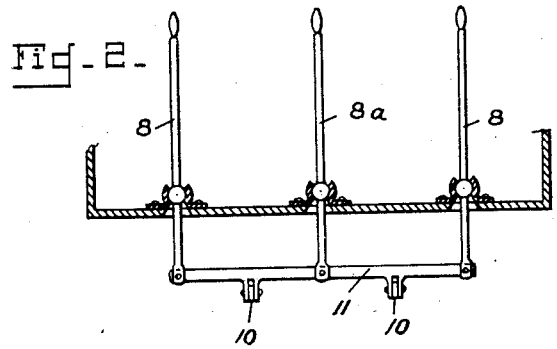
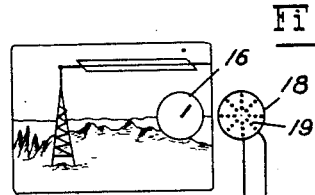
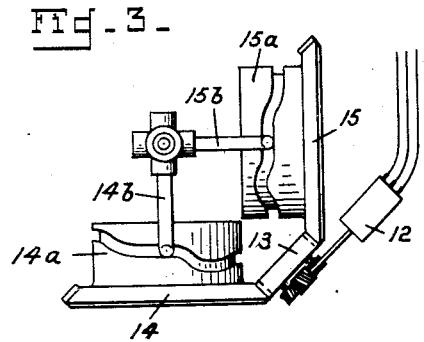
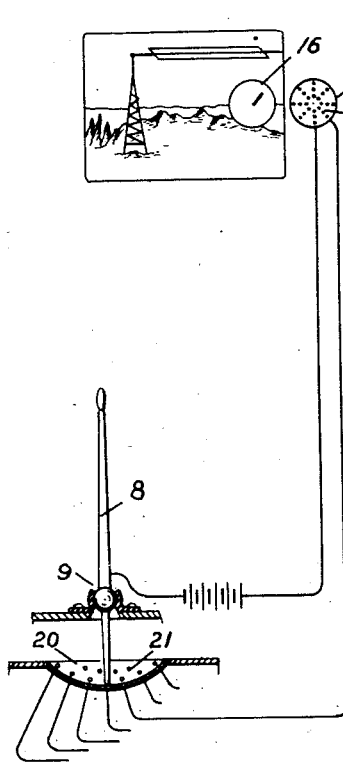
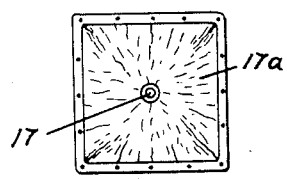
INVENTORS
J. C. Karnes
G. J. Kessenich
BY
W. N. Roach
ATTORNEY Patented Dec. 12, 1933

1,938,595

UNITED STATES PATENT OFFICE 1,938,595

TRAINING APPARATUS

James C. Karnes, Buffalo, N. Y., and Gregory J. Kessenich, Madison, Wis.

Application June 12, 1930. Serial No. 460,741

5 Claims. (Cl. 35—12)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to training apparatus and it has reference more particularly to a device whereby instructions in the operation of a control mechanism may be imparted to the accompaniment of visual interpretations of motion.

The invention consists in the provision of a control station having a director control and a follower control arranged before a screen on which motion pictures may be exhibited. The pictures represent changes in environment due to the motion of a vehicle such as an airplane and are taken with a camera focused at the position of the eyes of a passenger or pilot of a vehicle. The director control is to be operated in exact reproduction of the actual control of the vehicle and in conformity to the changes of environment presented in the image records.

Fig. 1 is a plan view of a training apparatus embodying the principles of the invention;

Fig. 2 is a detail sectional view on the line 2—2 of Fig. 1;

Fig. 3 is a plan view of an automatically directed control;

Fig. 4 is a diagrammatic view of a visual director and follower control;

Fig. 5 is a plan view illustrating the manner of obtaining the director control of Fig. 4.

Referring to the drawing by numerals of reference:

In Fig. 1 there is shown an arrangement for exhibiting motion pictures which consists of a screen 5, a projecting machine 6, and a plurality of seats 7. In front of each of the seats is a to control mechanism 8 of the type employed in a vehicle such as an airplane, and operating in the same manner. In the present instance the control is universally mounted through a ball and socket designated at 9. The lower extremities of all of the controls are interconnected by the longitudinal rods 10 and transverse rods 11 so that they are movable in unison.

One of the controls, preferably the central one 8a will hereinafter be referred to as the director control and is to be under the guidance of an instructor in the operation of the apparatus.

The image records to be exhibited on the screen are made with a camera occupying a position over the seat of an airplane and focused to have field of view corresponding to the field of view of a pilot. Any of the records made while the airplane is in motion will exactly reproduce the changes of environment that are presented to the pilot. The projection of such image records onto a screen will convey an impression of actual flight.

In conducting the training the instructor operates the director control in simulated reproduction of that movement of an actual control which results in the change of environment presented on the screen at any particular moment. The occupants of the remaining seats who are students undergoing instruction will grasp the follower controls and will thereby know the amount and direction of displacement resulting from the operation of the director control.

One of the students may be designated to operate his control and the instructor and the remaining students in following the displacement are able to note any variation from what they consider to be the proper operation. In dual control mechanisms employed on airplane the instructor's control is arranged to predominate and while a similar arrangement may be incorporated in the present structure, it is not considered necessary.

In Fig. 3 there is shown an arrangement for automatically directing the follower control mechanism. A motor 12 operating in synchronism with the motor of the projecting machine drives a system of gears 13, 14 and 15, the latter two gears being disposed at right angles to each other and respectively actuating timed cam records 14a and 15a. Cam followers 14b and 15b respectively associated with the cams are pivotally connected to the control mechanism to move it in mutually perpendicular planes.

The control mechanism is displaced according to the nature of the cams and the student in placing his hand on the control mechanism will note the displacement. The cams will positively oppose any actuation by the student unless it is in accordance therewith.

In Fig. 4 there is shown an arrangement for visually indicating to the student the proper as well as the actual displacement of the control mechanism. In this case the image record includes a director indicator 16 which has been obtained by photographing the upper extremity of the control in a dual control airplane. The control is arranged to protrude through a flexible curtain or background 17a (Fig. 5) and its deviations from a normal center are recorded on the film either by a multiplex camera or by a separate camera.

Adjacent the director indicator is a follower indicator 18 which is independent of the screen or visible through an aperture in the screen. It consists of radial rows of electric lamps 19. The control 8 serves as a switch and a contact plate 20 is provided having radially arranged contacts 21. The wiring between the contacts and the lights must be in reverse order where the lower extremity of the control serves to make the contact. This for the reason that the director indicator presents an image record of the upper extremity of the control in the airplane.

We claim:

1. A training apparatus comprising in combination a simulation of a vehicle control mechanism, a screen in front of the control mechanism, means for exhibiting motion picture records on the screen, and means in synchronism with the exhibiting means for automatically directing the control mechanism.

2. In apparatus for training in the piloting of a vehicle, a simulation of a control mechanism, a motion picture screen disposed for observation by a person at the simulation of the control mechanism, means for exhibiting on the screen motion pictures made from a moving vehicle and showing the environment of the vehicle, and the movement of the controls of the vehicle, and an indicator adjacent the screen showing the movement of the control at the simulation of the control mechanism.

3. In apparatus for training in the piloting of a vehicle, a simulation of a control mechanism, a motion picture screen disposed for observation by a person at the simulation of the control mechanism, means for exhibiting on the screen motion pictures made from a moving vehicle and showing the environment of the vehicle, and the movement of the controls of the vehicle, and means for registering the displacement of the simulation of the control mechanism.

4. In apparatus for training in the piloting of a vehicle, a simulation of a control mechanism, a motion picture screen disposed for observation by a person at the simulation of the control mechanism, means for exhibiting on the screen motion pictures made from a moving vehicle and showing the environment of the vehicle and means for indicating for the purpose of comparison a representation of the movement of the controls of the vehicle and the simulation of the control mechanism.

5. In apparatus for training in piloting a vehicle, a simulation of a control mechanism, a motion picture screen disposed for observation by a person at the simulation of the control mechanism, means for exhibiting on the screen motion pictures made from the point of vision of an operator of a moving vehicle and showing the environment of the vehicle, and means for registering the displacement of the simulation of the control mechanism made by the operator thereof in response to viewing the motion pictures.

JAMES C. KARNES.
GREGORY J. KESSENICH.